United States Statutory Invention Registration [19]

[11] Reg. Number: H785

Merritt [43] Published: Jun. 5, 1990

[54] DECONTAMINATION APPARATUS AND METHOD

[76] Inventor: Mike Merritt, Rte. 2, Box 44J, Kilgore, Tex. 75662

[21] Appl. No.: 423,768

[22] Filed: Oct. 18, 1989

[51] Int. Cl.[5] ..... B01D 37/00

[52] U.S. Cl. ..... 55/97

[56] References Cited

U.S. PATENT DOCUMENTS

| | | | |
|---|---|---|---|
| H460 | 4/1988 | Werner | 55/385.2 X |
| 4,765,352 | 8/1988 | Strieter | 134/99 X |
| 4,801,312 | 1/1989 | Mateson | 55/97 |

*Primary Examiner*—Matthew A. Thexton
*Assistant Examiner*—Chhaya Sayala

[57] ABSTRACT

Apparatus and method for control of hazardous particulates such as asbestos during removal of these materials. Asbestos was applied as insulation and wall finish in many buildings before the dangers of particulate asbestos were recognized. A substantially airtight containment is provided around the affected work space. An accessway is provided to allow access for persons tools equipment, and materials. A filtration machine is provided to induce air flow into the work space, desirably at all times during the removal process. Air discharged from the work space through the filtration machine is filtered. All air passages into the work space are filtered to avoid introduction of contamination from the outside. Filtered air passages are provided to sweep the work space to reduce exposure of the workers to the hazardous materials. In case of failure to maintain air flow during the removal process, there is containment of the hazardous materials, since all passageways connecting the contaminated work space to the outside are filtered. High efficiency Particulate Air (HEPA) filters may be used.

13 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DECONTAMINATION APPARATUS AND METHOD

BACKGROUND OF THE INVENTION

This invention relates to the removal of asbestos which has been applied for insulation and other purposes. Asbestos was used extensively for insulation in building construction and other purposes in the past. My invention also applies to removal of other hazardous particulate. Serious health hazards have now been associated with breathing particulate asbestos. Asbestos is being removed from many buildings where it was applied as part of wall finishes and insulation against heat transfer. Fibers 5 microns or greater in length and with an aspect ratio of 3:1 are addressed in environmental standards. A phase contrast optical microscope with about 440 magnification is used to count fibers. Requirements for an area to be undisturbed for 24 hours to allow fibers to settle does not provide for control of particulate matter in a work space where asbestos or other hazardous particulate matter is being removed. My invention does provide for control of particulate in a work space.

The description of my method and apparatus is directed to control asbestos particulates; however, my method and apparatus can be used to control other hazardous particulates.

Air filtration systems of many designs have been patented and others are available commercially. Vacuum flow collectors are available commercially. Vacuum flow collectors are in use to collect particulates such as graphite dust generated in performing machining operations on graphite work pieces. Filters then remove the particulates before the air is discharged to the outside.

U.S. Pat. No. 4,604,111 to Anthony Natale describes method and apparatus for controlling particulate matter in asbestos removal projects, for example: Natale provides an enclosed space, air flow establishing a negative air pressure, air flow entry, filtered air discharge, and seal of the air flow entry in case of the loss of the negative air pressure. Natale teaches the use of polyethylene plastic film flag seals to close air flow entryways to the contaminated work space.

A polyethylene plastic flap acting as a check valve allowing air flow through a doorway can be seen as not providing an effective seal of the doorway under condition of the loss of vacuum in the work space. Movement of contaminated air out of the work space can be expected even with low air flows caused by wind or artificial air circulation by adjacent air conditioning or ventilation blowers.

U.S. Pat. No. 2,710,574 to H. E. Runion describes a system for removing mist or particulates form an enclosure. U.S. Pat. No. 4,255,169 to R. M. Leliaert describes an energy conservation system of recirculating air to an industrial process with intermediate removal of dust or dirt. U.S. Pat. No. 4,175,934 to Arnold Lang discloses a "Clear Air Device" utilizing HEPA (High Efficiency Particulate Air) filtration to cleanse air for a positive pressure clean air room. U.S. Pat. No. 3,498,032, incorporated here by reference, describes a High Efficiency Particulate Air filter as covered by U.S. Federal Standard 209a.

A number of techniques have been developed to control particulate contamination during the removal of asbestos and other hazardous materials. Workers removing the hazardous materials need to be protected. Other people who must of necessity be near the work site need to be protected. For example, hazardous materials are to be removed from a portion of an airport terminal, hospital, or other site which needs to be in continued use.

It is the usual practice to establish and continue air circulation through a work space during the entirety of the decontamination process. If, however, there is a failure to continue the air circulation due to power failure or mechanical problem, the prior art does not teach effective method or apparatus to effectively seal the work space.

A long felt need exists to prevent escape of particulates from the work space at all times, even in the event of failure to continue air circulation during the decontamination process. In addition, a need exists for method and apparatus that is reasonably accomplished by decontamination workers with normal materials at hand.

SUMMARY OF THE INVENTION

My invention provides for improved environment for removal of hazardous materials such as asbestos from contaminated spaces. My invention provides for pre filtration of air before entry into the work space, reduction of pressure in the work space, and filtration of the air before discharge into the environment. A containment of the targeted contaminated area must be provided. Polyethylene plastic film may be used to seal and define the containment area. Filters are provided on all air inlets. A blower exhausts air form the containment area. Filters are provided in the exhaust passage to prevent unacceptable discharge of hazardous particulates. An airlock may be provided for access to the work space. High efficiency particulate air filters may be used in the inlet and exhaust passages.

BRIEF DESCRIPTION OF THE DRAWING

A more complete understanding of the invention may be had by reference to the following Detailed description when taken in conjunction with the accompanying drawing wherein.

DETAILED DESCRIPTION

Figure 1:
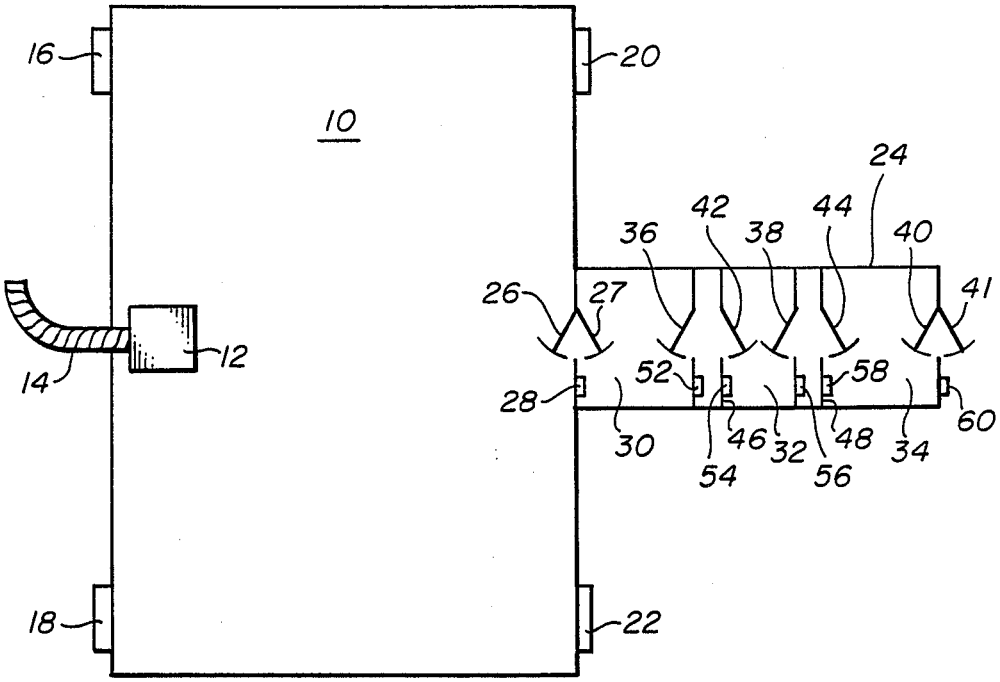
FIG. 1 is a plan view of the embodiment of the invention.

Referring now to FIG. 1, the preferred embodiment of the invention is illustrated. The contaminated work space 10 is sealed by existing walls, floor, ceiling, doors, and windows as far as possible. Any cracks or openings are sealed by polyethylene plastic film, staples, tape, caulking and other means well known in the industry. For purposes of this specification, sealed means generally sealed as described above, but is substantially airtight, but is not absolutely airtight, allowing for cracks, gaps, tears in polyethylene film, and the like.

A particulate filtration machine 12 contains a blower which receives air from the work space 10 through a filter or series of filters and then exhausts or discharges the air to the outside of work space 10, through an outlet 14. For purposes of this specification, outside means the space outside the work space 10 and the sealed spaces attached thereto.

Filters 16, 18, 20, and 22 may be provided to cause air flow across all areas of the work space 10.

An accessway 24 is provided for workers to enter and exit, and to allow passage of tools, equipment, and materials.

Accessway 24 provides a door 26 and a filter 28. The door 26 should seal very well, airtight if possible to provide a sealed door means. The filter 28 should provide the required filtration of air entering the containment area, and should be free of any external flow restriction.

A contaminated locker room 30 is provided as part of accessway 24 for the workers to change in and out of their work clothing as they enter of leave the work space 10.

As herein described, a sealed doorway is defined as generally sealed, as a close fitting door, preferably with weather strip, a poly (polyethylene) film covered opening with a slit in the film and a poly film flap on the side upstream of air flow to cause the film flap to seal in the presence of any pressure differential of air flow toward the work space 10. A sealed doorway is intended to prevent free flow of air, but for the purposes of this specification allows small cracks, or gaps, and is not necessarily completely airtight. All sealed doorways are not only substantially airtight, they are preferably equipped with a door closer, designed for the purpose or improvised.

Filters as used in this specification are defined as any of a variety of filters sufficient to trap most, if not all, of the hazardous particulates to be removed; including, but not limited to high efficiency particulate air (HEPA) filters.

A shower room 32 is provided as part of accessway 24 for the workers to take a shower to remove particulate matter from their persons before leaving the work site.

A clean locker room 34 is provided as a part of accessway 24 for the workers to leave their clean street clothing to avoid contamination of this clothing during their work time.

Sealed doorway 36 separates the contaminated locker room 30 from the shower room 32. Sealed doorway 38 separates the shower room 32 from the clean locker room 34. Sealed doorway 40 separates the clean locker room 34 from the outside.

Optional airlock walls 46 and 48 may be provided with sealed doorways 42 and 44 to provide additional doors to reduce unfiltered air flow through accessway 24 while personnel pass through accessway 24. Filters 28, 52, 54, 56, 58, and 60 filter air as it passes through accessway 24 into work space 10.

A particulate filtration machine 12 is installed in communication with work space 10, shown inside the work space 10 in the drawing, but could be outside the work space 10 and work just as well. An outlet hose 14 is sealed to work space 10 wherever the outlet hose 14 passes through the containment of work space 10. In this arrangement, contaminated air enters the filtration machine 12, is filtered, and moved by blower through outlet hose 14 to outside the work space 10.

Figure 2:
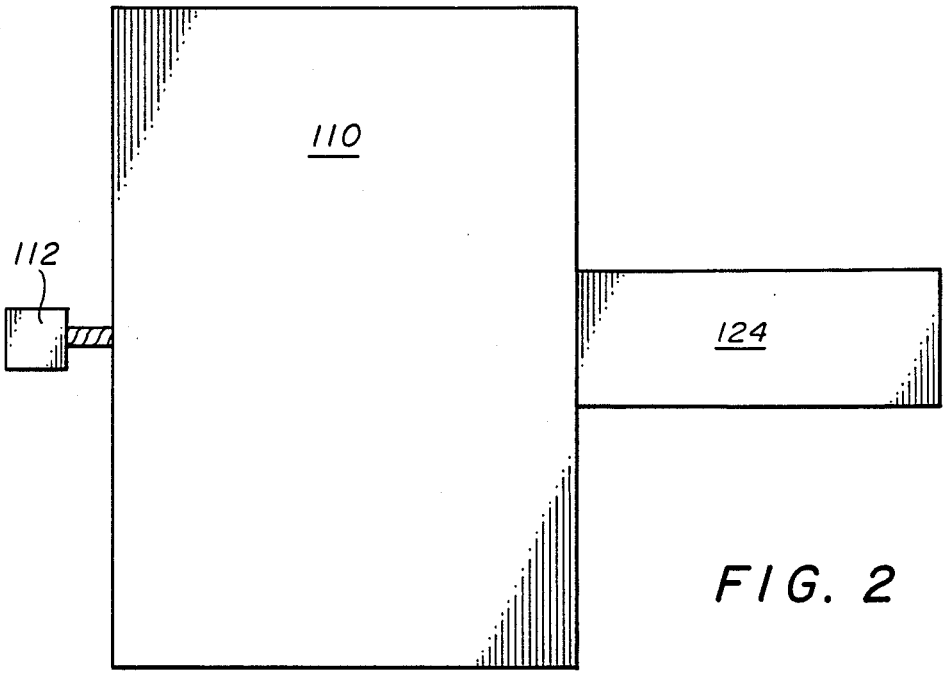
FIG. 2 is a plan view of an alternate embodiment of the invention.

Referring to FIG. 2, an alternate arrangement can be used to connect the particulate filtration machine 112 to work space 110. In this arrangement an inlet hose 50 to the filtration machine carries contaminated air from the work space 110 to filtration machine 112 where the air is filtered and moved by the blower in filtration machine 112 to the outside environment. This arrangement is preferable where there is a limitation in size of work space 110. An accessway 124 is provided for workers to enter and exit, and to allow passage of tools, equipment, and materials with the same features as accessway 24 in FIG. 1. Other features of the alternative embodiment described in FIG. 2 are the same as described for the preferred embodiment described in FIG. 1.

Referring again to FIG. 1, asbestos abatement or other hazardous particulate removal results must be measured against a baseline of the environment outside the intended work space 10. A special air sampling device draws a calibrated air volume through a filter pad. Phased contrast microscopy is then used to count the hazardous particles to establish the baseline environment contamination.

In a decontamination project, warning signs are erected around the work space 10; also under some conditions, barricades must be erected to establish a regulated area.

Any heating, ventilating, and air conditioning must be turned off to prevent inadvertent activation of this equipment which would cause uncontrolled spread of hazardous particles while removal is in progress. Nonstationary items such as furniture must be removed from the work space 10. Stationary items are decontaminated and covered with polyethylene film and sealed with adhesive or tape.

All windows and vents are sealed with wood, poly film, tape, adhesive, etc., making surer edges and joints are sealed. A combination of poly film with existing walls, floors, and ceilings is used to seal the work space 10. poly film joints are preferably overlapped at least 12 inches and sealed with adhesive or tape. Upper ends of the poly film can be held in place with tape, nails, tack strips, staples, adhesive, or other means available to the workers.

If, for example, in a refinery where accessway 24 is not feasible in conjunction with work space 10, temporary structure must be provided. Such temporary work structures may be constructed of a combination of plywood, fiber board, scaffold, or pipe frame sealed with poly film. It should be recognized that hazardous materials may be present in power plants, carbon plants and refineries and other open areas.

Referring now to FIG. 1, a project requiring removal of hazardous particulate matter such as asbestos would have work space 10 established around the contaminated area. Accessway 24 and all other features as hereinbefore described are established.

Operation of my system includes continuous operation of the particulate filtration machine 12 before removal work is started, until all removal work is completed, including non-working time. The bower in the filtration machine reduces the air pressure in work space 10 below ambient air pressure. This reduced air pressure in work space 10 induces air flow through the machine 12 filters and discharges the filtered air outside work space 10. Air removed form work space 10 is made up by flow through filters 16, 18, 20, and 22 to provide flow from these filters across work areas in work space 10; and through filters 28, 52, 54, 56, and 60 in accessway 24. The reduced air pressure in work space 10 causes any air leaks to flow frog outside to inside work space 10; preventing flow to contaminated air in work space 10 to the outside environment.

Air flows through filter 60, clean locker room 34, filters 58, 56, shower 32, filters 54, 52, contaminated locker room 30, and filter 28 into work space 10. This air flow is induced by the ambient air pressure causing flow into the reduced air pressure in work space 10, then into filtration machine 12 where it is filtered and the air pressure increased by the blower to cause the filtered air to be discharged through outlet 14.

Workers coming to work may enter clean locker room 34 through doors 40 and 41. There they may change from their clean clothing and leave the clean clothing in locker room 34, then go through doors 44, 38, 42, and 36 into locker room 30 where they may put on clothing left in locker room 30 previously. Alternately, they may bring a set of clean clothing to work and leave this clean clothing in locker room 34, and proceed to work in clean clothing worn to the job site.

Workers leaving the work site exit work space 10 through doors 26 and 27 into contaminated locker room 30 where their contaminated clothing is removed and placed in bags for disposition. Workers then walk through doors 36 and 42 into shower room 32 where they shower to remove hazardous materials from themselves. Then they walk through doors 36 and 42 into locker room 34 to put on clean clothing. Workers may then exit through doors 40 and 41. No two adjacent doors in accessway 24 should be opened simultaneously to avoid excessive passage of air through the doors rather than !he filter in each wall adjacent the door. For example, doors 36 and 38 should remain closed while door 42 is open. Thus, locker room facilities are provide for the critical clothing change and shower needed by the workers as they leave the work space at the end of a work day.

At no time should air flow through filters 28, 52, 54, 56, or 60 be restricted. At no time should air glow through filtration machine 12 be restricted.

As stated earlier, the filtration machine should be operated continuously throughout the job; that is 24 hours per day, 7 days per week Such continuous operation will sweep throughout all the ventilated spaces in accessway 24 and work space 10. Any particulates in these spaces will be moved into the filtration machine 10 and trapped in the filter.

In case of failure of the filtration machine during the progress of the hazardous material removal project, my system will still provide filtration of any air that may move through out of work space 10 because all provided passageways have filters to prevent exit of air containing hazardous particles. This safety feature works even if the work space 10 and accessway 24 are contained in a building with separate heating, ventilating, or air conditioning system which would cause drafts or air currents to blow on work space 10. This safety feature works if the work space 10 is outdoors and a natural wind blows, causing air flow through work space 10 since the air exiting the work space would be filtered, since all passageways are filtered.

Although a single embodiment of my invention with one variation has been illustrated in the accompanying drawings and the foregoing Detailed Description, it will be understood that the invention is not limited to the embodiment disclosed, but is capable of numerous rearrangements, modifications, and substitutions of parts and elements without departing from the spirit and scope of the invention.

I claim:

1. Apparatus for decontamination comprising:

a sealed work space having first filtered passage means for conducting air between the work space to outside the work space, first sealed door means for access to the work space, blower means for removing air from the work space, and second filtered means to filter air passing through the blower means.

2. Apparatus according to claim 1 further comprising a first airlock sealed to the work space and communicating with the first sealed door means; and a second sealed door means for access to the first airlock from outside, and a third filtered passage means for conducting air between the first airlock and the work space, and a fourth filtered passage means for conducting air between the first airlock and the outside.

3. Apparatus according to claim 2 further comprising a second airlock and communicating with the second sealed door and the fourth filtered passageway; a third sealed door means for access to the second airlock form; outside, and a fifth filtered passage means for conducting air between the second airlock and the outside.

4. Apparatus according to claim 3 further comprising a third airlock sealed to the second airlock and communicating with the third sealed door and the fifth filtered passage; a fourth sealed door means for access to the third airlock from the outside, and a sixth filtered passage means for conducting air between the third airlock and the outside.

5. Apparatus according to claim 3 further comprising a shower in the second airlock.

6. Apparatus according to claim 3 further comprising a first partition sealed in the second airlock, the partition separating the main portion of the second airlock from the first airlock, a fifth sealed door means in the first partition and communicating the first airlock and the second sealed airlock.

7. Apparatus according to claim 6 further comprising a second partition sealed in the third airlock; the partition separating the main portion of the third airlock from the second, a sixth sealed door means in the second partition and communicating the third airlock and the second airlock, and an eighth filtered passage in the second partition communicating the second airlock and the third airlock and the third airlock.

8. The method of decontamination comprising the steps of;

establishing a sealed work space surrounding the hazardous materials providing filtered inlet air passages, blowing air from the work space to outside the work space, filtering the air blown from the work space, whereby leakage of air to the work space will be from outside into the work space, and whereby failure to maintain the step of blowing air will still provide filtered air between the work space and outside the work space.

9. The method of claim 8 further comprising the step of providing a first airlock with a first sealed door and a first filtered passageway sealed to and communicating with the work space.

10. The method of claim 9 further comprising the step of providing a second airlock with a second sealed door and a second filtered passageway sealed to and communicating with the first airlock, first filtered passageway and the work space.

11. The method of claim 10 further comprising the step of providing a third airlock with a third sealed door and a third filtered passageway sealed to the second airlock and communicating with the first and second airlocks, first and second filtered passageways and the work space.

12. The method of claim 9 further comprising the step of providing a shower in the second airlock.

13. The method of claim 11 further comprising the steps of providing clothing changing facilities in the first and third airlocks.

* * * * *